Patented Oct. 4, 1938

2,132,193

UNITED STATES PATENT OFFICE 2,132,193

PRODUCTION OF PARTIALLY HYDROGENATED HYDROXY COMPOUNDS

Curt Schuster and Hans Krzikalla, Ludwigshafen-on-the-Rhine, Germany, assignors to General Aniline Works, Inc., New York, N. Y., a corporation of Delaware No Drawing. Application December 2, 1936, Serial No. 113,879. In Germany December 12, 1935

2 Claims. (Cl. 260—310)

The present invention relates to the production of partially hydrogenated hydroxy compounds.

We have found that valuable partially hydrogenated hydroxy compounds are obtained by treating aromatic or heterocyclic hydroxy compounds containing at least two nuclei which are joined together directly and which may contain other substituents in addition to the hydroxy groups and which contain at least one ring free from hydroxy groups, in alkaline solution with hydrogen under pressure in the presence of hydrogenation catalysts.

As hydroxy compounds suitable for the reaction may be mentioned for example hydroxy compounds of the naphthalene series, as for example alpha- and beta-naphthol themselves, hydroxynaphthoic acids, hydroxynaphthoic acid amides, such as hydroxynaphthoic acid anilide, toluidide or xylidide, dihydroxynaphthalenes, and similar hydroxy compounds of anthracene, phenanthrene, diphenyl, diphenylene oxide, quinoline, carbazole and phenylpyrazolones which, as is known, are capable of reacting as hydroxy compounds.

The products formed by the reaction are hydrogenated in that nucleus which carries no hydroxyl groups. Thus for example from beta-naphthol there is obtained 2-hydroxy-5.6.7.8-tetrahydronaphthalene, from 2.3-hydroxynaphthoic acid there is obtained 5.6.7.8-tetrahydro-2.3-hydroxynaphthoic acid, from 2.3-hydroxynaphthoic acid anilide there is obtained 5.6.7.8-tetrahydro-2.3-hydroxynaphthoic acid anilide, from 1.3-dihydroxynaphthalene there is formed 5.6.7.8.9.10-hexahydro-1.3-dihydroxynaphthalene, from 2.4-dihydroxyquinoline there is formed 5.6.7.8-tetrahydro-2.4-dihydroxyquinoline and from 1-phenyl-3-methyl-5-pyrazolone there is formed 1-cyclohexyl-3-methyl-5-pyrazolone. In some cases the hydrogenation may also partially embrace the nucleus carrying the hydroxyl group or groups.

The reaction is carried out by bringing the hydroxy compound serving as initial material into aqueous-alkaline or alcoholic-alkaline solution and, after adding a hydrogenation catalyst, as for example a nickel catalyst, a nickel-chromium or a nickel-cobalt catalyst, which may be distributed on a carrier, treating with hydrogen under pressure in a suitable vessel, as for example a rotary or stirring autoclave.

It has been found to be advantageous to carry out the reaction at temperatures of from about 70° to 150° C., but in many cases the reaction may be successfully carried out at temperatures above or below the said limits. The pressure of hydrogen used may be varied; it is especially suitable to work with a pressure above 25 atmospheres, preferably between about 100 and 250 atmospheres.

The isolation of the reaction products is effected in a simple manner by filtering off the catalyst after the absorption of the necessary amount of hydrogen, acidifying and if desired purifying the precipitated substances by crystallization or distillation.

The partially hydrogenated compounds are much more simply obtainable according to this invention than hitherto; some of the compounds obtainable were hitherto unknown. The compounds are of industrial importance as intermediate products for dyestuffs or for pharmaceutical purposes.

The following examples will further illustrate how this invention may be carried out in practice but the invention is not restricted to these examples. The parts are by weight.

Example 1

940 parts of 2.3-hydroxynaphthoic acid are dissolved in 5500 parts of water with the addition of 300 parts of potassium hydroxide and 50 parts of a nickel-chromium catalyst are added. The catalyst may be prepared for example as follows: 2000 parts of nickel carbonate are made into a paste with water, well mixed with a solution of 50 parts of chromic acid and dried. The mixture is first heated at 300° C. in a current of nitrogen and then at 350° C. in a current of hydrogen. The initial material is mixed with this catalyst in a stirring autoclave and hydrogenated at 120° C. under a hydrogen pressure of 180 atmospheres. When the absorption of hydrogen is completed, the catalyst is filtered off and the filtrate acidified with dilute sulphuric acid. The 5.6.7.8-tetrahydro-2.3-hydroxynaphthoic acid which separates is filtered off by suction and dried. The yield amounts to about 85 per cent of the theoretical yield.

Example 2

520 parts of 2.3-hydroxynaphthoic acid anilide are dissolved in 4000 parts of water with the addition of 150 parts of potassium hydroxide and 80 parts of alcohol. After adding 50 parts of a nickel-chromium catalyst of the composition specified in Example 1, the whole is heated at 120° C. under a hydrogen pressure of 200 atmospheres in a stirring autoclave until, after about 6 hours, the absorption of hydrogen is completed. The catalyst is filtered off and the filtrate acidified; 5.6.7.8 - tetrahydro-2.3-hydroxynaphthoic acid anilide is thus obtained in a yield of 90 per cent. It crystallizes from alcohol in broad, short prisms having a melting point of 183° C.

The alkaline solution of this anilide yields a brown dyestuff by coupling on the fibre or in substance with diazo compounds, as for example with diazotized para-nitraniline.

Example 3

696 parts of 1-phenyl-3-methyl-5-pyrazolone are dissolved in 5000 parts of water with an addition of 250 parts of potassium hydroxide. 50 parts of a nickel-chromium catalyst according to Example 1 are added and hydrogenation effected at 120° C. under a pressure of 180 atmospheres. In this manner 3 molecular proportions of hydrogen are absorbed for each molecular proportion of pyrazolone employed.

When the absorption of hydrogen has ceased, the catalyst is filtered off and the filtrate is acidified with acetic acid. The 1-cyclohexyl-3-methyl-5-pyrazolone formed is first precipitated as a semisolid viscous mass which becomes a crystalline solid after a short time. After recrystallization from benzene it melts at from 152° to 153° C. The yield amounts to about 85 per cent of the theoretical yield.

What we claim is:—

1. A process for the production of 1-cyclohexyl-3-methyl-5-pyrazolone which consists in treating 1-phenyl-3-methyl-5-pyrazolone in caustic alkaline solution with hydrogen at a temperature of from about 70° to 150° C., and at a pressure between about 100 and 250 atmospheres in the presence of hydrogenation catalysts until hydrogen is no longer absorbed.

2. A process for the production of N-cyclohexyl pyrazolones which consists in treating a phenyl pyrazolone in caustic alkaline solution with hydrogen at a temperature of from 70 to 150° C. and at a pressure above 25 atmospheres in the presence of hydrogenation catalysts, until hydrogen is no longer absorbed.

CURT SCHUSTER.
HANS KRZIKALLA.